2,949,474
Patented Aug. 16, 1960

2,949,474
NEW UNSATURATED GLYCIDYL ETHERS, POLYMERS THEREOF AND METHODS FOR PRODUCING THEM

Guy C. Murdoch, Levittown, and Henry J. Schneider, Hatboro, Pa., assignors to Rohm & Haas Company, Philadelphia, Pa., a corporation of Delaware No Drawing. Filed Feb. 6, 1956, Ser. No. 563,425

10 Claims. (Cl. 260—348)

This invention relates to new vinyl ethers and sulfides containing a glycidyl radical. It also concerns polymeric products obtained by the addition polymerization of such new unsaturated glycidyl ethers and/or by the condensation polymerization through the oxirane linkage. This invention also includes methods for producing the new compounds.

The compounds of the invention are those having the structure of Formula I:

I        $CH_2=CHXAOCH_2CH\underset{X}{\overset{}{\diagdown\diagup}}CH_2$ where X is selected from the group consisting of O and S, and A is selected from the group consisting of alkylene groups having 2 to 12 carbon atoms which may be substituted with cycloalkyl groups, such as cyclohexyl, aryl groups, such as phenyl, chlorophenyl, etc., and aralkyl groups such as benzyl; and groups of the formula $-(C_nH_{2n}X)_xC_nH_{2n}-$ wherein $n$ is an integer having a value of 2 to 12 and $x$ is an integer having a value of 1 to 5. The compounds of Formula I may be obtained by the reaction of a compound of Formula II with a compound of Formula III:

II        $YCH_2CH\underset{X}{\overset{}{\diagdown\diagup}}CH_2$

III        $CH_2=CHXAOZ$ where Y is selected from the group consisting of Cl and Br, and Z is an alkali metal, such as sodium, potassium, or lithium.

The alkali metal alcoholate of Formula III may be obtained by the reaction of an alkali metal, such as of sodium, potassium, or lithium, or an alkali metal hydroxide or alkoxide with a corresponding alcohol having the Formula IV:

IV        $CH_2=CHXAOH$ under the usual conditions of carrying out this type of reaction for producing other alkali metal alcoholates. Examples of the alcohols from which which the alkali metal alcoholate of Formula III may be produced include: β-hydroxyethyl vinyl ether, β-hydroxyethyl vinyl sulfide, 3-hydroxypropyl vinyl ether, 3-hydroxypropyl vinyl sulfide, β-hydroxy-α-methyl-ethyl vinyl ether, β-hydroxy-α-methyl-ethyl vinyl sulfide, β-hydroxypropyl vinyl ether, β-hydroxypropyl vinyl sulfide, 5-hydroxypentyl vinyl ether, 5-hydroxypentyl vinyl sulfide, β-hydroxy-α-phenyl-ethyl vinyl ether, β-hydroxy-α-phenyl-ethyl vinyl sulfide, 8-hydroxy-octyl vinyl ether, 8-hydroxyoctyl vinyl sulfide, 12-hydroxylauryl vinyl ether, 12-hydroxylauryl vinyl sulfide, β-hydroxyethoxy-ethyl vinyl ether, β-hydroxyethoxyethyl vinyl sulfide, β-hydroxyethylthioethyl vinyl ether, β-hydroxyethylthioethyl vinyl sulfide, and compounds of the formulas:

$CH_2=CHOCH(CH_3)CH_2OCH(CH_3)CH_2OH$
$CH_2=CHOCH(CH_3)CH_2SCH(CH_3)CH_2OH$
$CH_2=CHOCH_2CH(CH_3)OCH_2CH(CH_3)OH$
$CH_2=CHOCH_2CH(CH_3)SCH_2CH(CH_3)OH$
$CH_2=CHOC_2H_4OC_2H_4OC_2H_4OH$
$CH_2=CHOC_2H_4SC_2H_4SC_2H_4OH$
$CH_2=CHOCH(CH_3)CH_2OCH(CH_3)$
                    $CH_2OCH(CH_3)CH_2OH$
$CH_2=CHOCH(CH_3)CH_2SCH(CH_3)$
                    $CH_2SCH(CH)_3CH_2OH$
$CH_2=CHO(CH_2CH_2O)_5CH_2CH_2OH$
$CH_2=CHO(CH_2CH_2S)_5CH_2CH_2OH$

In the reaction of the alkali metal alcoholate of Formula III with the compound of Formula II which is preferably an epihalohydrin, the two reactants may be used in equimolar proportions. However, it is preferable to have an excess of the epihalohydrin over the equimolar ratio in order to suppress the reaction of the alkali metal alcoholate with the oxirane portion of the epihalohydrin of Formula II. This excess of the epihaldohydrin is preferably quite considerable, such as from 4 to 5 moles thereof for each mole of the alcoholate of Formula III. The maintenance of an excess of the epihalohydrin may be further aided by the gradual addition of the alcoholate of Formula III to the epihalohydrin throughout the reaction period. The temperature of reaction may be from room temperature up to 100° C., and it is generally preferable to carry it out at a temperature from 40° to 80° C. The reaction is quite rapid but not violent, and the temperature may be controlled readily either by controlling the rate of addition of the alcoholate or, if it is desired to introduce the alcoholate at higher speeds, external cooling may be provided by suitably jacketing the reaction vessel in conventional manner. In general, the reaction is substantially complete at the end of the period during which addition of the alcoholate takes place, but the reaction may be continued from ½ to one hour beyond such time to be sure that it is completed.

While the reaction of the alcoholate of Formula III with the epihalohydrin of Formula II may be effected without a separate solvent, it is sometimes preferable to carry the reaction out in the presence of a solvent, such as an alcohol, preferably a secondary alcohol such as isopropanol, sec-butyl alcohol, or sec-amyl alcohol. In using such a solvent, the alcoholate of Formula III is dissolved in the solvent and then the solution is added gradually to the epihalohydrin. The temperature may be maintained within the range specified above either by controlling the rate of addition or by auxiliary cooling of the reaction medium.

An alternative procedure may involve the slurrying of the alcoholate of Formula III in an inert solvent in which the alcoholate is relatively insoluble, such as benzene, toluene, xylene, or dioxane, and then adding the slurry to the epihalohydrin. Again, in excess of the epihalohydrin is preferably provided for at all times and the temperature is maintained within the range specified above by suitably controlling the rate of addition, the dilution of the slurry of the alcoholate added, or application of external cooling.

Another alternative procedure, which frequently is the preferred procedure, is to make the alkali metal alkoxide of an alcohol solvent to be used, such as the alkali metal alkoxides of isopropanol, sec-butyl alcohol, or sec-amyl alcohol. Then an alcohol of Formula IV is dissolved in the solution of the alkali metal alkoxide of the solvent and the resulting solution is added to the epihalohydrin of Formula II. The conditions of temperature should be maintained within the range specified above and the preferred range may be maintained by properly controlling the rate of addition, the dilution and/or auxiliary cooling. In preparing the alkali metal alkoxide of the solvent, it is preferred to provide the maximum concentration of the alkoxide that still remains soluble in the reaction medium. This provides for maximum efficiency of operation in the subsequent reaction between II and III. In the solution of the alcohol of Formula IV in the solvent containing the alkali metal alkoxide thereof, there is an equilibrium in which the alkali metal shifts between the solvent and the alcohol of Formula IV so that in effect an alkali metal alkoxide having Formula III is produced in situ in the solution that is added to the epihalohydrin.

Regardless of which of the three alternative procedures are employed, the isolation of the compound of Formula I may be effected in one of two ways. The reaction mass is a two-phase composition containing liquid and solid material, the latter being the salt of alkali metal and halogen. This composition may be filtered to remove the salt and then the filtrate subjected to flash distillation to strip off low-boiling materials including unreacted alcohol of Formula IV, solvent, whether an alcohol or other type such as benzene or dioxane, and the epihalohydrin. If desired, these materials may be recycled. Then the residual oil is fractionated at reduced pressure which may be of the order of 2 mm. Hg absolute pressure to produce the product.

An alternative method for isolation may involve the addition of 1 to 2 volumes of water to each volume of the crude product, the separation of the two phases obtained, and the stripping from the organic (or non-aqueous) phase of any water-insoluble solvents remaining as well as the epihalohydrin and the fractional distillation of the residual oil to produce the product under reduced pressure as before.

The compounds of Formula I are generally high-boiling liquids at normal room temperature. They are generally insoluble in water but soluble in a great variety of organic solvents both polar and non-polar in character. Thus, they are generally soluble in alcohols, such as methanol, ethanol, isopropanol, sec-butanol, sec-amyl alcohol, acetone, dioxane, ethyl acetate, benzene, toluene, xylene, chlorinated solvents, such as carbon tetrachloride, chloroform and ethylene dichloride, dimethylformamide, dimethylacetamide, acetonitrile, and the nitroparaffins, such as nitroethane. Though the compounds contain a point of unsaturation and an epoxy linkage, they are reasonably stable, but they are preferably stored under refrigeration in the presence of an inhibitor for free radical polymerization.

Compounds of Formula I are useful as stabilizers for various halogen-containing polymeric materials including polyvinyl chloride, polyvinylidene chloride, and copolymers of vinyl chloride or vinylidene chloride with other monoethylenically unsaturated monomers like vinyl acetate, acrylonitrile, methyl acrylate, and so on.

The compounds of Formula I may be included in aminoplast resin-forming condensates such as those of urea-formaldehyde, triazine-aldehydes, such as melamine-formaldehyde, and the like to modify the properties of such condensates and the products made therefrom which may be molded articles or finishes on textiles as in the crease-proofing of textiles or the treatment thereof for water-proofing, for increasing water-repellency, or for reducing shrinkage thereof. The curing operation conventionally employed in conjunction with such aminoplast resins serves to cause polymerization of the compounds of Formula I by opening up the oxirane unit and condensation with the aminoplast components. The curing or baking operations are generally carried out in the presence of an acid catalyst, examples of which are disclosed hereinafter, at temperatures of 150° to 450° C. for periods of 10 seconds to one hour, the period generally being of a duration inversely proportional to the temperature. Such modified aminoplast condensates may be employed as adhesives or in the making of coatings for all sorts of substrates including wood, metal, leather, and so on.

The compounds of Formula I are particularly valuable in the preparation of polymeric materials by addition polymerization by bulk, solution, emulsion, or suspension techniques with the production of thermoplastic products and generally soluble products that are adapted to be applied to various uses, and especially as coatings. After application, such as in the coatings referred to, the dried films or other structures may be subjected to an ageing, baking, or curing operation to cross-link the polymer through the oxirane linkage to increase the solvent resistance and to reduce the thermoplasticity of the films or articles. Thus, glycidyl compounds of the kind covered by Formula I provide the plastics chemist and resin formulator, and workers in related arts, with a single polymerizable material which can be caused to undergo either or both of two types of polymerization reactions. The advantages of such a polymerizable compound include, for example, the greater adaptability of such compounds for a wider variety of service applications by merely varying the catalyst or other polymerization influences employed, so as to direct the course of the polymerization through the ethylenic linkage and/or the epoxy grouping as desired or as conditions may require.

One aspect of the present invention is based on our discovery that new and useful classes of polymerizable compositions and polymerized products, including reactive polymerization products, can be prepared by compounding, as for example by forming a homogeneous, or substantially homogeneous, mixture or blend, of a glycidyl ether of the kind embraced by Formula I and a monoethylenically or diethylenically unsaturated compound (or a plurality of such compounds) which is different from the said glycidyl ether and is copolymerizable therewith and then polymerizing the resulting mixture or blend as hereinafter more fully described. The glycidyl ether and the other copolymerizable monomer may be employed in any proportions, the chosen proportions being dependent largely upon economic considerations and the intended use of the polymerization product, that is, the particular properties desired in the copolymer. It has been found that copolymerization can be caused to take place primarily through the ethylenically unsaturated groupings of the respective comonomers, yielding a reactive copolymer which can be caused to polymerize further as a result of opening up or rupturing of the epoxy groups present therein.

In forming the thermoplastic addition polymers, suitable monoethylenically unsaturated compounds may be used including acrylic acid, methacrylic acid, esters of acrylic acid or methacrylic acid and monohydric alcohols such as methyl, ethyl, butyl, octyl, dodecyl, cyclohexyl, undecenyl, cyanoethyl, dimethylaminoethyl, and the like; esters of itaconic acid and similar alcohols; esters from maleic, fumaric or citraconic acids, and likewise similar alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, hydroxyethyl vinyl ether, aminoethl vinyl ether, aminopropyl vinyl ether, dimethylaminoethyl vinyl ether, vinyloxyethoxyethanol, vinyloxypropoxyethanol; vinyl sulfides, such as methyl, ethyl, propyl, n-butyl, etc. vinyl sulfide, hydroxyethyl vinyl sulfide, vinyl thioglycerol, vinyl α-thioethyl acetate, methacrylonitrile or acrylonitrile; acrylamide, or methacrylamide, and N-substituted amides of these types; vinyl chloride, vinyl bromide, vinylidene chloride, 1-chloro-1-fluoroethylene, or ethylene; N-vinyl amides, such as N-vinylpyrrolidone, or N-vinyl-alkyl-substituted pyrrolidones where 1 to 3 alkyl groups of 1 to 5 carbon atoms each may be present; N-vinyl caprolactam, N-vinyl-N,N'-ethyleneurea; and styrene.

The polymerization of compounds of Formula I with or without the comonomers mentioned may be effected in the presence of any of the so-called free radical catalysts or initiators such as an organic or inorganic peroxide catalyst, peroxy catalysts, such as persulfates and the azo catalysts. From 0.1% to 3% or more of the initiator or catalyst may be used, based on the total weight of the monomers. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis($\alpha,\gamma$-dimethylvaleronitrile), azobis($\alpha$-methylbutyronitrile), azobis($\alpha$-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which the alkyl has from 6 to 18 carbon atoms, such as octyl, dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)trimethylammonium chloride, and so on.

The polymers of the compounds of Formula I may be employed to reduce shrinkage of fabrics of wool, cotton, and rayon, and in this connection it has been found that they are surprisingly effective for the stabilization of wool fabrics. The polymers may also be incorporated as modifiers in aminoplast resins of the type mentioned hereinabove for the production of molded products and various formed articles, such as films, fibers, rods, tubes or cast shaped articles, and for the production of coatings on leather, paper, textile, wood, and so on for imparting water-repellency, water-proofing effects or crease-proofing effects. When applied to textiles or other articles for reducing shrinkage, crease-proofing or the like, the coatings or films produced may be subjected to a baking or curing operation at temperatures of 150° to 450° C. for periods of 10 seconds to one hour, the time being inversely proportional to the temperature. Optionally acid catalysts may be used to accelerate the curing. Examples of acid catalysts which effect cross-linking through the opening up of the epoxy grouping of the glycidyl ether are cumylsuccinic acid, maleic anhydride, paratoluene sulfonic acid, sulfuric acid, phosphoric acid, aluminum chloride, stannic chloride, ferric chloride, and the like. Similar curing or baking operations may be applied to formed articles of the thermoplastic polymers of the compound of Formula I under the conditions just stated optionally in the presence of an acid catalyst to effect cross-linking with consequent reduction in susceptibility to solvents and reduction in thermoplasticity. In the making of molded articles, pigments, dyes, opacifiers, fillers, mold lubricants and so on may be incorporated in the usual proportions to provide coloring or other modification of the product.

The polymers of the present invention are useful as blending agents for preformed polymers of halogen-containing monoethylenically unsaturated monomers, such as those of vinyl chloride or vinylidene chloride, including their homopolymers as well as their copolymers, with other monomers, such as vinyl acetate, acrylonitrile, etc., to improve the heat- and light-stability and, at the same time, to plasticize the polymers. It appears that the improved stability imparted to such halogen-containing polymers is attributable to the oxirane or thiirane linkage.

Copolymers of the compounds of Formula I with carboxylic acid-containing monomers, such as acrylic acid, methacrylic acid, itaconic acid, crotonic acid, maleic acid and so on, with or without other comonomers, provide improved polymeric compositions containing acid groups adapted to co-react with the epoxy linkage upon its opening during the curing or baking stage. Such copolymers generally provide for more rapid cross-linking under less severe reaction conditions or baking conditions.

As compared to glycidyl esters, such as glycidyl acrylate, the glycidyl compounds of Formula I of the present invention are generally far more resistant to hydrolysis under acid conditions since they lack the ester linkage. The curing under acid conditions of the polymers of the present invention, therefore, generally avoids loss of flexibility, softness and toughness, which is characteristic of the curing of glycidyl ester-polymers as a result of the hydrolysis of a considerable portion of the glycidyl groups and consequent breaking of many of the cross-links in the polymers of the glycidyl esters.

In the following examples, which are illustrative of the invention, the parts are by weight unless otherwise noted:

Example 1

(a) 2-(vinylthio)ethanol (119.3 grams, 1.14 moles) is added to a solution of sodium metal (26.7 grams, 1.16 moles) in isopropyl alcohol (728.5 grams, 12.14 moles). The sodium alkoxide solution (856.5 grams) is added, with stirring, during five hours to epichlorohydrin (467.3 grams, 5.07 moles) at 70° to 85° C. The product is filtered, yielding sodium chloride (63.5 grams, 1.10 moles). The filtrate is stripped of low-boiling material to a boiling point of 40° C./mm. Hg, and the residual oil is fractionated through a ½ by 20″ modified Vigreux column, yielding crude 2-(vinylthio)ethyl glycidyl ether (89.4 grams, 0.56 mole) which is refractionated through a ½ by 26″ column, packed with ⅛″ glass helices, yielding the substantially pure glycidyl ether (66.0 grams, 0.41 mole), boiling in the range 79° to 81° C. at 1.4 mm. Hg, a refractive index $n_D^{20}$ of 1.5028, and a density $d_4^{25}$ of 1.0830.

| | Percent C | Percent H | Percent S | Percent Oxirane Oxygen |
|---|---|---|---|---|
| Theoretical | 52.47 | 7.55 | 20.01 | 9.99 |
| Experimental | 52.20 | 7.48 | 20.03 | 9.5 |

(b) The product 3-(vinyloxy)propyl glycidyl ether is prepared in the same way substituting 1.15 gram moles of 3-hydroxypropyl vinyl ether for the 2-(vinylthio)-ethanol.

(c) Substituting 5.0 moles of epibromohydrin for the epichlorohydrin in the procedure outlined in part (a)

Example 2

2-(vinyloxy)ethanol (201.5 grams, 2.29 moles) is added to a solution of potassium metal (143.0 grams, 3.66 moles) in isopropyl alcohol (749.0 grams, 12.45 moles). The potassium alkoxide solution (1030.0 grams) is added, with stirring, during three hours at 46° to 85° C. to epichlorohydrin (1028 grams, 11.1 moles). The product is filtered, yielding potassium chloride (244.0 grams, 3.28 moles). The filtrate is rapidly distilled at 1.0 mm. Hg through a Claisen head into a Dry Ice (solid $CO_2$)-acetone cooled receiver. The distillate is fractionated through a ½ by 20" modified Vigreux column, yielding crude 2-(vinyloxy)ethyl glycidyl ether (264.5 grams, 1.84 moles). The crude ether is refractionated through a ½ by 26" column packed with ⅛" glass helices, yielding the substantially pure glycidyl ether (205.1 grams, 1.42 moles), boiling at 66° C./2.7 mm. Hg, $n_D^{20}$ 1.4478, $d_4^{25}$ 1.0495.

|  | Percent C | Percent H | Percent Oxirane Oxygen |
|---|---|---|---|
| Theoretical | 58.31 | 8.39 | 11.10 |
| Experimental | 57.12 | 7.89 | 11.3 |

Example 3

Dry sodium methylate (145.3 grams, 2.56 moles) is added to 2-(vinylthio)ethanol (1126 grams, 10.81 moles). A mixture (87.0 grams) containing methanol and some of the vinylthioethanol is stripped off to a boiling point of 50° C./12 mm. Hg. A 620 gram-portion of the residual solution containing 2-(vinylthio)ethanol (437 grams, 4.20 moles) and sodium 2-(vinylthio)ethylate (183 grams, 1.34 moles) is added, during two hours, to epichlorohydrin (528.7 grams, 5.72 moles) at 30° to 60° C. The reaction mixture is stirred an additional 15 minutes and then filtered, yielding sodium chloride (82.2 grams, 1.40 moles). Low-boiling material is stripped (to a boiling point of 58° C./1.5 mm. Hg) from the filtrate and the residual oil fractionated through a ½ by 20" modified Vigreux column, yielding 2-(vinylthio)ethyl glycidyl ether (107.0 grams, 0.67 mole), boiling in the range 72° to 87° C./2.2 mm. Hg.

Example 4

2-(vinyloxy)isopropanol (112.9 grams, 1.10 moles) is added to a solution of potassium metal (45.3 grams, 1.16 moles) in isopropyl alcohol (328.5 grams, 5.47 moles). The potassium alkoxide solution (479.5 grams) is added, during 2¼ hours, to epichlorohydrin (460.0 grams, 5.00 moles) at 20° to 60° C. The reaction is stirred an additional 20 minutes, then filtered, yielding potassium chloride (75.9 grams, 0.99 mole). The filtrate is stripped (to a boiling point of 35° C./10 mm. Hg) of low-boiling material and the residual oil is fractionated through a ½ by 20" modified Vigreux column, yielding 2-(vinyloxy)isopropyl glycidyl ether (50.2 grams, 0.32 mole), boiling at 83° to 84° C./8 mm. Hg, $n_D^{20}$ 1.4461, $d_4^{25}$ 1.0108.

|  | Percent C | Percent H | Percent Purity—Oxirane Anal. |
|---|---|---|---|
| Theoretical | 60.74 | 8.92 | 100 |
| Experimental | 59.78 | 8.79 | 100.1 |

Example 5

(a) 5-(vinyloxy)pentanol-1 (301.8 grams, 2.32 moles) is added to a solution of potassium metal (101.0 grams, 2.59 moles) in isopropyl alcohol (749.0 grams, 12.48 moles). The potassium alkoxide solution (1111.0 grams) is added, during five hours, to epichlorohydrin (1006.0 grams, 10.9 moles) at 24° to 59° C. The reaction mixture is stirred an additional two hours and then filtered, yielding potassium chloride (185.0 grams, 2.49 moles). The filtrate is stripped (to a boiling point of 43° C./3.0 mm. Hg) of low boilers, and the residual oil fractionated through a ½ by 20" modified Vigreux column, yielding 5-(vinyloxy)pentyl glycidyl ether, boiling at 70° C./0.2 mm. Hg, $n_D^{20}$ 1.4503, $d_4^{25}$ 0.9773.

|  | Percent C | Percent H | Percent Purity—Oxirane Anal. |
|---|---|---|---|
| Theoretical | 64.49 | 9.74 | 100 |
| Experimental | 64.58 | 10.16 | 98.5 |

(b) The product 12-(vinyloxy)lauryl glycidyl ether is obtained by the procedure of part (a) substituting 2.3 gram moles of 12-hydroxylauryl vinyl ether for the 5-(vinyloxy)pentanol-1.

Example 6

(a) 2-(vinyloxy)ethylthioethanol (89.3 grams, 0.60 mole) is added to a solution of potassium (29.3 grams, 0.75 mole) in isopropyl alcohol (194.3 grams, 3.24 moles). The potassium alkoxide solution (296.8 grams) is added, during one hour, to epichlorohydrin (292.8 grams, 3.17 moles) at 50° to 67° C. The reaction mixture is stirred an additional ten minutes and then filtered, yielding potassium chloride (43.5 grams, 0.58 mole). The filtrate is stripped (to a boiling point of 32° C./0.4 mm. Hg) of low boilers and the residual oil fractionated through a ½ by 20' modified Vigreux column, yielding 2-(vinyloxy)ethylthioethyl glycidyl ether, boiling at 105° C./0.25 mm. Hg, $n_D^{20}$ 1.4936, $d_4^{25}$ 1.0880.

|  | Percent C | Percent H | Percent S | Percent Purity—Oxirane Anal. |
|---|---|---|---|---|
| Theoretical | 52.91 | 7.90 | 15.69 | 100 |
| Experimental | 53.04 | 7.91 | 15.47 | 98.5 |

(b) The product of Formula V:

V 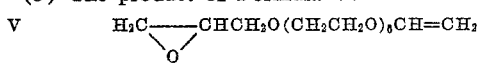

is prepared by the procedure of part (a) substituting 0.6 gram mole of $CH_2=CHO(CH_2CH_2O)_5CH_2CH_2OH$ for the 2-vinyloxy)ethylthioethanol therein.

Example 7

2-[2-vinylthio)ethylthio]ethanol (133.2 grams, 0.81 mole) is added to a solution of potassium metal (49.5 grams, 1.27 mole) in isopropanol (323.5 grams, 5.40 mole). The resulting alkoxide solution (460.8 grams) is added, during 5 hours, to epichlorohydrin (353.1 grams, 3.72 moles) at 40° to 66° C. The mixture is stirred an additional one-quarter hour, then filtered yielding potassium chloride (86.0 grams, 1.15 moles). The filtrate is washed with an equal volume of water, then stripped (to boiling point of 40° C./0.5 mm. Hg) to remove low-boiling material. Flash distillation was continued yielding an oil, boiling from 85° C./0.6 mm. Hg to 120° C./0.2 mm. Hg. This oil is redistilled through a ½ x 20" Vigreux column yielding 2-[2-(vinylthio)ethylthio]ethyl glycidyl ether (54.4 grams, 0.24 mole) boiling in the range of 94° to 125° C./0.2 mm. Hg.

Example 8

2-(vinylthio)propanol-1 (203.2 grams, 1.72 moles) is added to a solution of potassium metal (84.4 grams, 2.16 moles) in isopropanol (543.1 grams, 9.05 moles). The alkoxide solution (793.0 grams) is added at 43° to 50°

C., during four and one-half hours, to epichlorohydrin (816.0 grams, 8.83 moles). The product is filtered yielding potassium chloride (146.2 grams, 1.96 moles). The filtrate is washed with an equal volume of water, then flash distilled (to boiling point of 35° C./1.0 mm. Hg). The residual oil is fractionated through a ½ x 26″ Vigreux column yielding 2-(vinylthio)propyl glycidyl ether (93.6 grams, 0.54 mole), B.P. 90° C./3.0 mm. Hg, 73° C./0.8 mm. Hg, $n_D^{20}$ 1.4956, $d_4^{25}$ 1.0539.

|  | Percent C | Percent H | Percent S | Percent Oxirane Oxygen |
|---|---|---|---|---|
| Theoretical | 55.14 | 8.10 | 18.40 | 9.2 |
| Experimental | 55.28 | 8.11 | 18.34 | 9.0 |

*Example 9*

2-phenyl-2-(vinylthio)ethanol (213.8 grams, 1.19 moles) is added to a solution of potassium metal (57.5 grams, 1.47 moles) in isopropanol (421.2 grams, 7.02 moles). The alkoxide solution (664.5 grams) is added, during four hours, to epichlorohydrin (505.0 grams, 5.45 moles) at 50° to 55° C. The reaction product is stirred an additional fifteen minutes, then filtered, yielding potassium chloride (94.0 grams, 1.26 moles). The filtrate is stripped of low-boiling material (to boiling point of 40° C./0.1 mm. Hg). The residual oil is fractionated by a falling film still at 133° to 144° C./0.2 mm. Hg to yield 2-phenyl-2-(vinylthio)ethyl glycidyl ether (73.5 grams, 0.31 mole).

|  | Percent Sulfur | Percent Oxirane Oxygen |
|---|---|---|
| Theoretical | 13.6 | 6.3 |
| Experimental | 14.4 | 5.3 |

*Example 10*

Diethyl ether (7.8 grams) and twenty drops of 45% BF₃ etherate are combined in a 300 ml. flask. This mixture is cooled by an ice-water bath and a solution of 2-vinyloxyethyl glycidyl ether (15.2 grams, 0.11 mole) in diethyl ether (31.2 grams) is added dropwise with stirring. After stirring the vinyl ether and catalyst together at ice temperature for four hours, the temperature is raised slowly to 36° C. (reflux). The resulting polymer is extracted by diethyl ether in a Soxhlet apparatus. The insoluble portion (5.9 grams) is dried in a vacuum oven to constant weight. The ether extract is evaporated. The residual oil is redissolved in benzene, reprecipitated in n-heptane and dried in the vacuum oven yielding a soluble polymer (2.5 grams) which contains no appreciable oxirane function.

*Example 11*

2-(vinylthio)ethyl glycidyl ether (15.83 grams, 0.099 mole) is polymerized in bulk by charging together with 2,2′-azo-bis-isobutyronitrile (0.13 gram) to a screw cap jar and heating to 80° to 100° C. for twenty-four hours. The product, a viscous pale yellow liquid is purified by two precipitations from toluene into methanol, yielding the liquid homopolymer (6.7 grams), 98.5% pure by sulfur analysis, 85.9% by oxirane analysis.

*Example 12*

(a) Bulk copolymerization of styrene (19.92 grams, 0.192 moles) with 2-(vinylthio)ethyl glycidyl ether (5.03 grams, 0.031 mole) is carried out in a screw capped glass jar, with benzoyl peroxide (0.12 gram) catalyst in a steam-heated oven (80 to 100° C.) overnight. The polymer is reprecipitated twice (from benzene into methanol) and dried in a vacuum oven. The product (6.4 grams) is a white, brittle solid, containing 6.50 mole percent of the glycidyl ether by sulfur analysis, 3.88 mole percent by oxirane oxygen analysis.

(b) Bulk copolymerization of styrene (19.86 grams, 0.191 mole) and 2-(vinylthio)ethyl glycidyl ether (5.02 grams, 0.031 mole) is carried out in like manner, except that 2,2′-azo-bis-isobutyronitrile (0.15 gram) is used as catalyst. The product (13.0 grams) contains 5.02 mole percent of the glycidyl ether, by sulfur analysis. The properties are identical to the product described in part (a) above.

(c) Bulk copolymerization of vinyl acetate (5.03 grams, 0.057 mole) with 2-(vinylthio)ethyl glycidyl ether (10.04 grams, 0.063 mole) is carried out by the procedure described in part (b) above. The product (8.0 grams) is a viscous liquid polymer.

(d) Bulk copolymerization of acrylonitrile (14.91 grams, 0.282 mole) with 2-(vinylthio)ethyl glycidyl ether (4.03 grams, 0.025 mole) by the procedure described above in part (b) gives an insoluble polymer (12.7 grams) containing 17.8 mole percent glycidyl ether, by sulfur analysis. The product is purified by extraction with diethyl ether in a Soxhlet apparatus, followed by drying in a vacuum oven.

(e) Bulk copolymerization of diethyl maleate (15.10 grams, 0.088 mole) with 2-(vinylthio)ethyl glycidyl ether (3.96 grams, 0.025 mole) by the procedure described in part (b) above yields a mixture of a soluble polymer (2.5 grams) containing 36.9 mole percent glycidyl ether by sulfur analysis and an insoluble polymer (5.8 grams) containing 52.5 mole percent glycidyl ether by sulfur analysis. The polymers are separated by Soxhlet extraction.

(f) Bulk copolymerization of ethyl acrylate (14.89 grams, 0.150 mole) and 2-vinyloxyethyl glycidyl ether (2.06 grams, 0.014 mole) is carried out by the procedure described in part (a) above. The clear, glassy polymer (10.0 grams) contains 3.75 mole percent glycidyl ether by oxirane oxygen analysis.

*Example 13*

Maleic anhydride (7.2 grams, 0.075 mole) and 2-vinyloxyethyl glycidyl ether (10.2 grams, 0.073 mole) are charged together with benzene (132.8 grams) and benzoyl peroxide (0.8 gram) to a 300 ml. flask. The mixture is heated to reflux, with stirring for three hours. The precipitated polymer is extracted by diethyl ether in a Soxhlet apparatus and dried in a vacuum oven. The white, powdery copolymer produced (16.6 grams) is soluble in strong aqueous caustic.

*Example 14*

2-vinyloxyethyl glycidyl ether (6.5 grams, 0.05 mole), deionized water (90.5 grams), ammonium persulfate (0.25 gram) and sodium hydroxyoctadecane sulfonate (7.6 grams) are charged to a 250 ml. autoclave and cooled in a Dry Ice-acetone bath. Vinyl chloride (61.0 grams, 0.99 mole) is added as a liquid and the autoclave is capped quickly. The emulsion is stirred for twenty-six hours at 40° to 56° C. The autoclave is vented, the emulsion broken and the raw polymer (39.5 grams) separated and dried. The polymer is further purified by reprecipitation. The white, powdery copolymer contains 1.5 mole percent glycidyl ether by oxirane oxygen analysis, 3.8 mole percent by chlorine analysis.

*Example 15*

(a) 2-(vinylthio)ethyl glycidyl ether (1.25 grams, 0.01 mole) benzene (45.9 grams) and 2,2′-azobis-isobutyronitrile (1.0 gram) are charged to a 250 ml. autoclave. Vinyl chloride (104.5 grams, 1.70 moles) is added in the manner described in Example 14 above. The solution is stirred at 64° C. for twenty-one hours. The polymer is precipitated twice (from tetrahydrofurane into methanol) and dried. The white, powdery copolymer (55 grams) contains 0.17 mole percent glycidyl ether by sulfur analysis, 2.8 mole percent by chlorine analysis.

(b) 5-vinyloxypentyl glycidyl ether (28.5 grams, 0.15 mole) and vinyl chloride (102.5 grams, 1.67 moles) are solution copolymerized by the method described in part (a) above. The white, powdery copolymer (34.5 grams)

contains 2.6 mole percent glycidyl ether by oxirane oxygen analysis, 12.0 mole percent by chlorine analysis.

*Example 16*

Polymerization mixtures each containing 50 parts of monomeric material, 50 parts of toluene and 0.25 part of azodiisobutyronitrile are heated under reflux in a glass reaction vessel for 24 hours, further additions of 0.1% of the catalyst being made during the polymerization at the end of 4, 6, and 20 hours. The monomeric material in succeeding runs consists of a mixture of 2-(vinylthio)ethyl glycidyl ether with butyl methacrylate and methyl methacrylate in the following weight ratios:

(1) 5:60:40 respectively
(2) 10:60:40 respectively
(3) 15:60:40 respectively
(4) 25:60:40 respectively
(5) 33:60:40 respectively The several solutions of the respective polymers and copolymers obtained are mixed with 5% of cumylsuccinic acid, coated on glass plates and baked one-half hour at 400° F. The films obtained from the polymers show increasing resistance to gasoline in proportion to the amount of glycidyl monomer therein.

*Example 17*

A dispersion of a copolymer is prepared by emulsifying 95 parts by weight of n-butyl acrylate with 5 parts by weight of 2-(vinylthio)ethyl glycidyl ether in about 300 parts by weight of water with about 6 parts by weight of an ethylene oxide condensation product of an octyl phenol containing between 30 and 50 oxyethylene units per molecule. To the emulsified monomers a 15° C., 0.12% by weight of ammonium persulfate, 0.16% of sodium hydrosulfite, and a small amount of ferrous sulfate (1 to 5 p.p.m.) are added to catalyze the copolymerization which is carried out for a period of about fifteen minutes during which the temperature rose to 45° C.

Portions of the resin dispersion are diluted to polymer concentrations of 17%, 13%, and 9% respectively and the resulting dispersions are each divided into two parts. To one part of each dispersion of different concentration, 1% of sulfuric acid is added. The other parts of different concentrations are uncatalyzed. Each of the six dispersions are then applied in a pad to separate pieces of a wool flannel each 10 inches square (2/2 right hand 45° twill, 55 x 44; S-twist in ends, Z-twist in inches) as described above. After drying 10 minutes at 240° F., followed by curing for 10 minutes at 300° F., it is found that the proportions of copolymer applied to the fabric by the dispersions of 9%, 13%, and 17% concentrations are about 2.5%, 3.5%, and 4.5% respectively of the weight of the fabric. The shrinkages of the treated fabrics after the five-hour wash described hereinabove are summarized in Table I. The untreated control shrank 59% after such a wash.

TABLE I

| Run | Copolymer Applied To Fabric, percent | Catalyst | Shrinkage, percent |
|---|---|---|---|
| (a) | 2.5 | No | 5.5 (aver. of 2 runs) |
| (b) | 2.5 | Yes | 16 |
| (c) | 3.5 | No | 1 (aver. of 2 runs) |
| (d) | 3.5 | Yes | 8 |
| (e) | 4.5 | No | 0 (aver. of 2 runs) |
| (f) | 4.5 | Yes | 3 |

*Example 18*

The procedure of Example 17 is followed except that 90 parts of n-butyl acrylate are copolymerized with 10 parts of 2-(vinylthio)ethyl glycidyl ether. The wash results are summarized in Table II. The control fabric shrank 59%.

TABLE II

| Run | Copolymer Applied To Fabric, percent | Catalyst | Shrinkage, percent |
|---|---|---|---|
| (a) | 2.5 | No | 7 |
| (b) | 2.5 | Yes | 12 |
| (c) | 3.5 | No | 2 |
| (d) | 3.5 | Yes | 3 |
| (e) | 4.5 | No | 0 |
| (f) | 4.5 | Yes | 0 |

*Example 19*

A mixture of methyl methacrylate, methacrylic acid, and 2-(vinylthio)ethyl glycidyl ether in proportions by weight of 87:8:5 with 0.022% of benzoyl peroxide (based on the weight of monomers) is molded into a sheet 12" by 4" by 0.25" at 110° C. A tough, soft sheet is obtained having a swelling ratio of 2:2 in chloroform indicating a high degree of cross-linking.

It is to be understood that changes and variations may be made without departing from the spirit and scope of the invention as defined in the appended claims.

We claim:

1. A compound of Formula I:

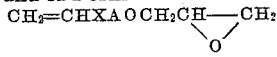

where X is selected from the group consisting of O and S, and A is selected from the group consisting of alkylene groups having 2 to 12 carbon atoms; alkylene groups having 2 to 12 carbon atoms substituted with a member selected from the group consisting of cyclohexyl, phenyl, chlorophenyl, and benzyl; and groups of the general formula —$(C_nH_{2n}X)_xC_nH_{2n}$— wherein $n$ is an integer having a value of 2 to 12 and $x$ is an integer having a value of 1 to 5.

2. A compound of the formula

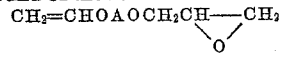

in which A is selected from the group consisting of alkylene groups having 2 to 12 carbon atoms; alkylene groups having 2 to 12 carbon atoms substituted with a member of the group consisting of cyclohexyl, phenyl, chlorophenyl, and benzyl; and groups of the general formula —$(C_nH_{2n}X)_xC_nH_{2n}$— wherein $n$ is an integer having a value of 2 to 12 and $x$ is an integer having a value of 1 to 5.

3. A compound of the formula

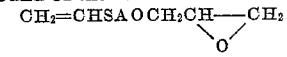

in which A is selected from the group consisting of alkylene groups having 2 to 12 carbon atoms; alkylene groups having 2 to 12 carbon atoms substituted with a member of the group consisting of cyclohexyl, phenyl, chlorophenyl, and benzyl; and groups of the general formula —$(C_nH_{2n}X)_xC_nH_{2n}$— wherein $n$ is an integer having a value of 2 to 12 and $x$ is an integer having a value of 1 to 5.

4. 2-(vinylthio)ethyl glycidyl ether.
5. 2-(vinyloxy)ethyl glycidyl ether.
6. 2-(vinylthio)propyl glycidyl ether.
7. 5-(vinyloxy)pentyl glycidyl ether.
8. 2-(vinyloxy)ethylthioethyl glycidyl ether.
9. Vinyl glycidyl ether of an ethylene glycol.
10. Vinyl glycidyl ether of ethylene glycol.

References Cited in the file of this patent

UNITED STATES PATENTS

| | | |
|---|---|---|
| 2,512,996 | Bixler | June 27, 1950 |
| 2,637,713 | Suen et al. | May 5, 1953 |
| 2,640,037 | Parry et al. | May 26, 1953 |
| 2,687,405 | Rothrock et al. | Aug. 24, 1954 |
| 2,728,781 | Shokal | Dec. 27, 1955 |
| 2,743,261 | Coover et al. | Apr. 24, 1956 |
| 2,743,285 | Wilkes | Apr. 24, 1956 |
| 2,771,461 | Weinstock | Nov. 20, 1956 |